(12) United States Patent
Toback

(10) Patent No.: US 7,070,376 B1
(45) Date of Patent: Jul. 4, 2006

(54) SELF-DRILLING, SELF-ANCHORING FASTENER FOR CONCRETE

(75) Inventor: Alex S. Toback, West Hartford, CT (US)

(73) Assignee: Simpson Strong-Tie Company, Inc., Dublin, CA (US)

(*) Notice: Subject to any disclaimer, the term of this patent is extended or adjusted under 35 U.S.C. 154(b) by 738 days.

(21) Appl. No.: 09/634,908

(22) Filed: Aug. 9, 2000

Related U.S. Application Data

(60) Provisional application No. 60/170,689, filed on Dec. 14, 1999.

(51) Int. Cl.
  *F16B 25/10* (2006.01)
  *F16B 33/06* (2006.01)
  *F16B 35/02* (2006.01)

(52) U.S. Cl. .............. 411/82.2; 411/82.3; 411/387.1; 411/387.2; 411/387.7; 411/412; 411/417; 411/258; 411/930

(58) Field of Classification Search .......... 52/705; 411/412, 411, 413, 387.1–387.8, 399, 304, 411/303, 82.2, 82.3, 258, 930, 414, 417
See application file for complete search history.

(56) References Cited

U.S. PATENT DOCUMENTS

| | | | |
|---|---|---|---|
| 1,485,202 A | 2/1924 | Rosenberg | |
| 1,802,560 A | 4/1931 | Kerwin | |
| 2,423,171 A | 7/1947 | Boak | |
| 3,061,455 A | 10/1962 | Anthony | |
| 3,093,177 A * | 6/1963 | Villo | 411/302 |
| 3,108,443 A | 10/1963 | Schuermann et al. | |
| 3,568,746 A * | 3/1971 | Faroni et al. | 411/302 |
| 3,639,137 A | 2/1972 | Marinelli | |
| 3,682,507 A * | 8/1972 | Waud | 287/189.36 F |
| 3,739,682 A | 6/1973 | Siebol et al. | |
| 3,831,213 A * | 8/1974 | Bedi | 470/11 |
| 3,867,864 A | 2/1975 | Knohl | |
| 3,902,399 A | 9/1975 | Yotti | |
| 3,925,996 A | 12/1975 | Wiggill | |
| 3,937,119 A | 2/1976 | Ernst | |
| 4,034,641 A | 7/1977 | Williams, Jr. et al. | |
| 4,100,954 A | 7/1978 | Müller et al. | |
| 4,110,053 A | 8/1978 | Buchholz | |
| 4,257,307 A * | 3/1981 | Regensburger | 411/387 |
| 4,325,985 A * | 4/1982 | Wallace | 427/54 |
| 4,350,464 A | 9/1982 | Brothers | |
| 4,420,604 A | 12/1983 | Wallace | |
| 4,439,077 A | 3/1984 | Godsted | |
| 4,536,524 A | 8/1985 | Hart et al. | |
| 4,545,712 A | 10/1985 | Wallace | |

(Continued)

FOREIGN PATENT DOCUMENTS

EP 0 133 773 3/1985

(Continued)

*Primary Examiner*—Robert Canfield
(74) *Attorney, Agent, or Firm*—Charles R. Cypher; Law Offices of James R. Cypher

(57) ABSTRACT

A fastener adapted for anchoring into a masonry structure, such as a concrete block, employs an epoxy resin system so that the fastener is both mechanically engaged and bonded to the structure. In one preferred configuration, the bead is composed of a hardener, a resin and a nylon powder and has a cardioid-shaped configuration which subtends substantially 360° around the shank at an intermediate position of a threaded portion of the fastener. Various configurations are disclosed, including a fastener wherein adhesive in microencapsulated form is also applied to a lower intermediate portion. In addition, wings may extend from the shank.

20 Claims, 5 Drawing Sheets

U.S. PATENT DOCUMENTS

| | | |
|---|---|---|
| 4,652,194 A | 3/1987 | Tajima et al. |
| 4,692,080 A * | 9/1987 | Hyner et al. ............. 411/387.1 |
| 4,713,855 A * | 12/1987 | Hyner et al. .................... 470/9 |
| 4,730,970 A * | 3/1988 | Hyner et al. ............. 411/387.4 |
| 4,773,111 A * | 9/1988 | Hyner et al. .................... 470/9 |
| 4,842,467 A | 6/1989 | Armstrong |
| 4,973,210 A | 11/1990 | Osborne et al. |
| 5,061,136 A | 10/1991 | Dixon et al. |
| 5,188,496 A | 2/1993 | Giannuzzi |
| 5,190,426 A | 3/1993 | Wieder et al. |
| 5,282,708 A | 2/1994 | Giannuzzi |
| 5,294,227 A | 3/1994 | Forster et al. |
| 5,304,023 A * | 4/1994 | Toback et al. .............. 411/387 |
| 5,397,812 A | 3/1995 | Usami et al. |
| RE34,969 E * | 6/1995 | Dixon et al. ................ 411/412 |
| 5,452,977 A | 9/1995 | Terrizzi |
| 5,531,553 A | 7/1996 | Bickford |
| 5,611,652 A * | 3/1997 | Duffy et al. ................ 411/178 |
| 5,661,938 A | 9/1997 | Ditka et al. |
| 5,674,035 A | 10/1997 | Hettich et al. |
| 5,746,039 A * | 5/1998 | Nystrom ...................... 52/639 |
| 5,867,958 A | 2/1999 | Ditka et al. |
| 5,885,041 A * | 3/1999 | Giannuzzi et al. ............ 411/82 |
| 5,908,278 A * | 6/1999 | Hasan et al. ................. 411/533 |
| 5,957,646 A | 9/1999 | Giannuzzi et al. |
| 6,000,892 A * | 12/1999 | Tagasaki ...................... 411/413 |
| 6,142,719 A * | 11/2000 | Daubinger et al. ...... 411/387.8 |
| 2001/0051080 A1* | 12/2001 | Godsted et al. ............ 411/82.2 |

FOREIGN PATENT DOCUMENTS

| | | |
|---|---|---|
| EP | 0 560 789 B1 | 9/1993 |
| GB | 466039 | 5/1937 |
| GB | 1 510 686 | 5/1978 |
| GB | 1 519 139 | 7/1978 |
| GB | 2 115 511 A | 9/1983 |
| GB | 2 152 171 A | 7/1985 |
| WO | WO92/10688 | 6/1992 |
| WO | WO99/05421 | 2/1999 |

\* cited by examiner

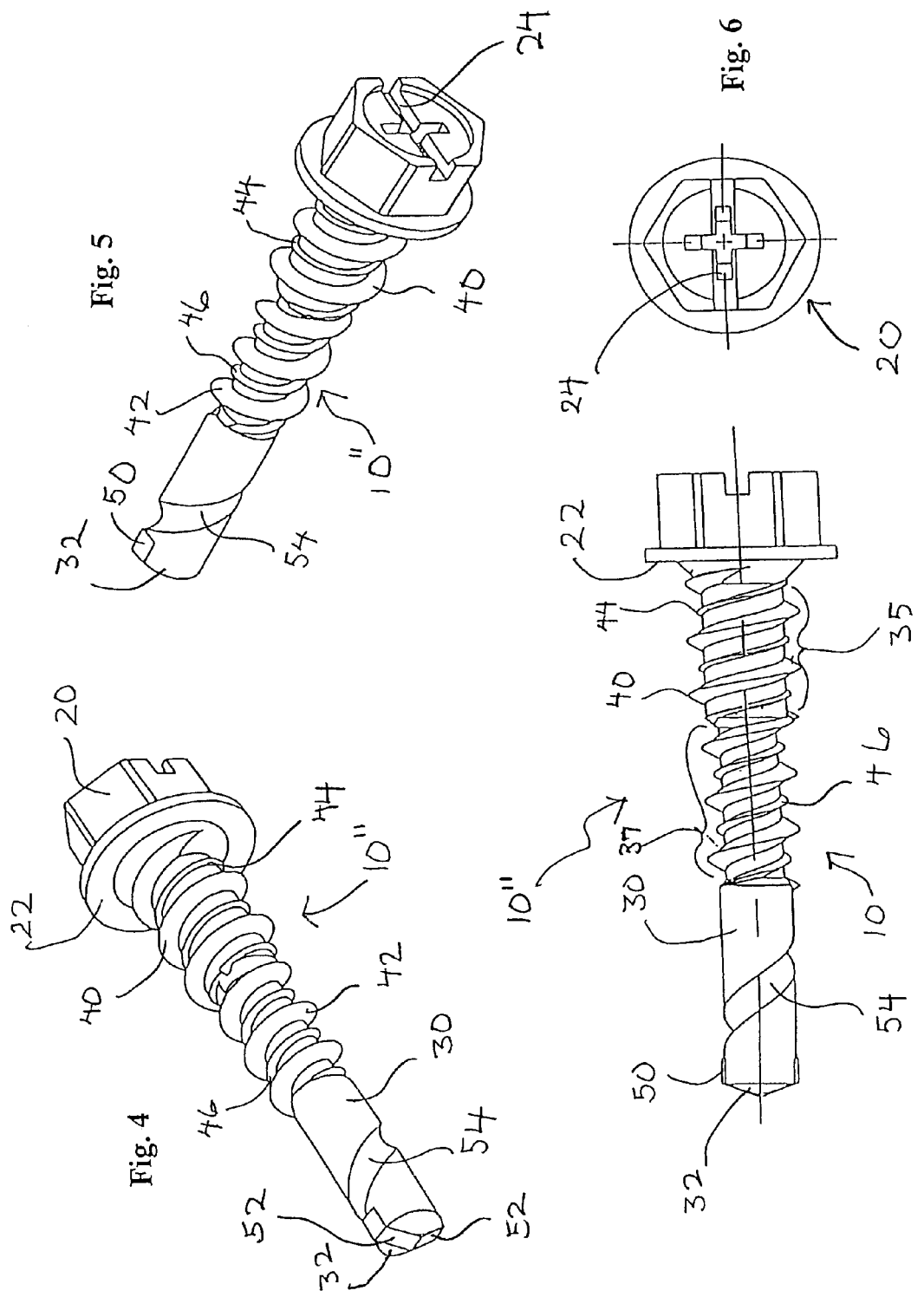

US 7,070,376 B1

SELF-DRILLING, SELF-ANCHORING FASTENER FOR CONCRETE

CROSS-REFERENCE TO RELATED APPLICATION

This application claims the priority of U.S. Provisional Application No. 60/170,689 filed on Dec. 14, 1999.

BACKGROUND OF THE INVENTION

This invention relates generally to fasteners which anchor an object to a support structure. More particularly, the present invention relates to fasteners which are designed to secure an object to a masonry structure.

In the attachment of panels, supports, channels or other devices to a masonry-like structure, it is commonplace to utilize a stud anchor which incorporates a wedging mechanism. Such devices frequently require a manipulation of the wedge to properly set the device within the bore and will also require a secondary fastener member, such as a nut, to be placed over the workpiece and tightened on the stud. Additionally, such devices require pre-drilling of the hole into which the stud anchor is located, thereby complicating installation. Removeability of the anchor stud, when desired, is also a major problem when using these devices. Further, the nut may back off the stud, allowing the panel to come loose from the support structure.

Screws to be used in concrete require pre-drilling and the insertion of a sleeve or two-part adhesive system before they can be inserted. The requirements involve considerable labor costs that must be added to the material cost.

SUMMARY OF THE INVENTION

Briefly stated, the invention in a preferred form is a fastener for fastening an object, such as an electrical panel box, to a masonry-like structural member. The fastener includes a head having a radially extending generally planar engagement surface for engagement to the panel box. The head also comprises an internal cavity or circumferential shape for receiving an applied torque. A shank axially extends from the engagement surface to a distal end terminating at a self-drilling tip.

The shank further comprises a proximal portion adjacent the shank proximal end, a first intermediate portion adjacent the proximal portion and a second intermediate portion between the first intermediate portion and the tip. A thread extends helically along said intermediate portions. A resin bead is applied to the first intermediate portion. The bead is composed of a hardener, a resin and a nylon powder although other resin formulations can be used. The bead preferably has a generally cardioid-shaped configuration which subtends substantially 360° around the axis of the shank. The bead formulation may be composed of approximately 30% nylon powder by volume. In one embodiment, the bead formulation is composed of approximately five milliliters of hardener, five milliliters of resin and five milliliters of nylon powder.

An adhesive in a microencapsulated form may also be applied to the second intermediate portion. In one alternative embodiment, a radially extending wing may project from the shank distal portion. The self-drilling means may also comprise a carbide flute. The thread is preferably a buttress thread. In a preferred configuration, wherein the thread has a generally uniform axial spacing, the proximal portion extends a distance which ranges from 2–3 times the axial spacing, and the first intermediate portion extends axially a distance of approximately 4–5 times the axial spacing.

In another embodiment, the shank includes a proximal portion adjacent the head defining a first diameter. The shank includes a distal portion adjacent the tip. The distal portion has a second diameter which is less than the shank proximal portion diameter. The shank proximal and distal portions are connected by a frusto-conical surface. A first thread extends helically along the length of the shank proximal portion. A second thread extends helically along a part of the length of the shank distal portion. The second thread has a crest or outside diameter which is preferably substantially equal to the proximal portion diameter. The crest diameters of the first end and second threads remain constant along the length of their respective thread. Notches may be provided in the crests of the first and/or second threads along a portion of their length. The first and second thread shank portions may comprise protuberances.

The first protuberance extends helically along the shank proximal portion spaced between adjacent convolutions of the first thread. The first thread defines a crest diameter which is greater than the first protuberance crest diameter. The second protuberance extends helically along the shank distal portion spaced between adjacent convolutions of the second thread. The second thread defines a crest diameter which is greater than the second protuberance crest diameter. Preferably, the second protuberance crest diameter is substantially the same as the drill tip diameter and the first protuberance crest diameter is substantially the same as the second thread crest diameter. The crest diameters of the first end and second threads remain constant along the length of their respective thread.

The shank tip functions as a drill tip and defines a drill tip diameter. Preferably the shank tip comprises a pair carbide flutes. A material transfer slot or channel may be formed in the shank distal portion and extends from the shank tip to the second thread. In preferred embodiments, the material transfer channel extends helically.

An adhesive, such as, for instance, a microencapsulated epoxy is applied over the threads and shank of the fastener. Preferably, the adhesive is applied selectively to the second thread and shank areas encompassed by the second thread.

Alternatively, a polymer, such as, for instance nylon, may be applied over a portion of the fastener threads and shank. Preferably, the polymer is applied over at least ninety degrees of the total circumference of the first thread area, including the shank proximal portion. The inventive fastener may include both an adhesive applied to the second thread and distal shank and a polymer applied to the first threads and proximal shank.

In a different embodiment of the inventive fastener, the shank distal portion further comprises a pair of radially extending tabs or wings. Preferably, the tabs define a diameter which is substantial equal to or slightly greater than the first thread crest diameter.

In use, the fastener tip is placed against the masonry structure and torque is applied to the head. The carbide flutes drill into the masonry creating dust. The dust is channeled or transferred via the slots in the fastener shank to the second thread. The notches and/or protuberances function to ease entry of the fastener into the masonry structure as well as help move the dust to the thread areas. In the area of the second thread, the dust mixes with the microencapsulated adhesive, with the mix being moved to the first thread area. When the fastener is driven fully into the masonry structure, the epoxy/masonry dust mixture bonds the fastener to the masonry structure. The polymer coating, if present, serves to mechanically wedge the threads of the fastener against the support structure, increasing the resistance of the fastener to loosening.

Use of the embodiment incorporating radially extending tabs is similar to use of the above embodiment, with the exception that the fastener is placed against a board located against the masonry structure. Application of torque to the fastener causes the carbide flutes to drill through the board. When the tabs enter the board, the hole diameter is enlarged so that the first threads are accommodated without contacting the board. As the fastener moves through the board, the carbide flutes drill into the masonry structure. When the tabs contact the masonry structure they are sheared from the shank, with the remaining operation of the fastener remaining the same as described above. This fastener may have a countersinking flat head if needed.

An object of the invention is to provide a new and improved self-drilling fastener for mounting an object to a masonry structure.

Another object of the invention is to provide a new and improved concrete fastener for mounting an object to a masonry structure in an efficient installation process which upon completion is resistant to loosening.

A further object of the invention is to provide a new and improved concrete fastener which is capable of both a mechanical and bonding engagement of high integrity.

Other objects and advantages of the invention will become apparent from the drawings and the specification.

BRIEF DESCRIPTION OF THE DRAWINGS

The present invention may be better understood, and its numerous objects and advantages will become apparent to those skilled in the art, by reference to the accompanying drawings in which:

FIG. 3 is a side elevational view of a different embodiment of the inventive fastener;

FIG. 4 is a perspective view of the fastener of FIG. 3;

FIG. 5 is a view of the fastener of FIG. 3 from a perspective different than FIG. 4;

FIG. 6 is a plan view showing the head of the inventive fastener;

DETAILED DESCRIPTION OF THE PREFERRED EMBODIMENTS

Figure 2:
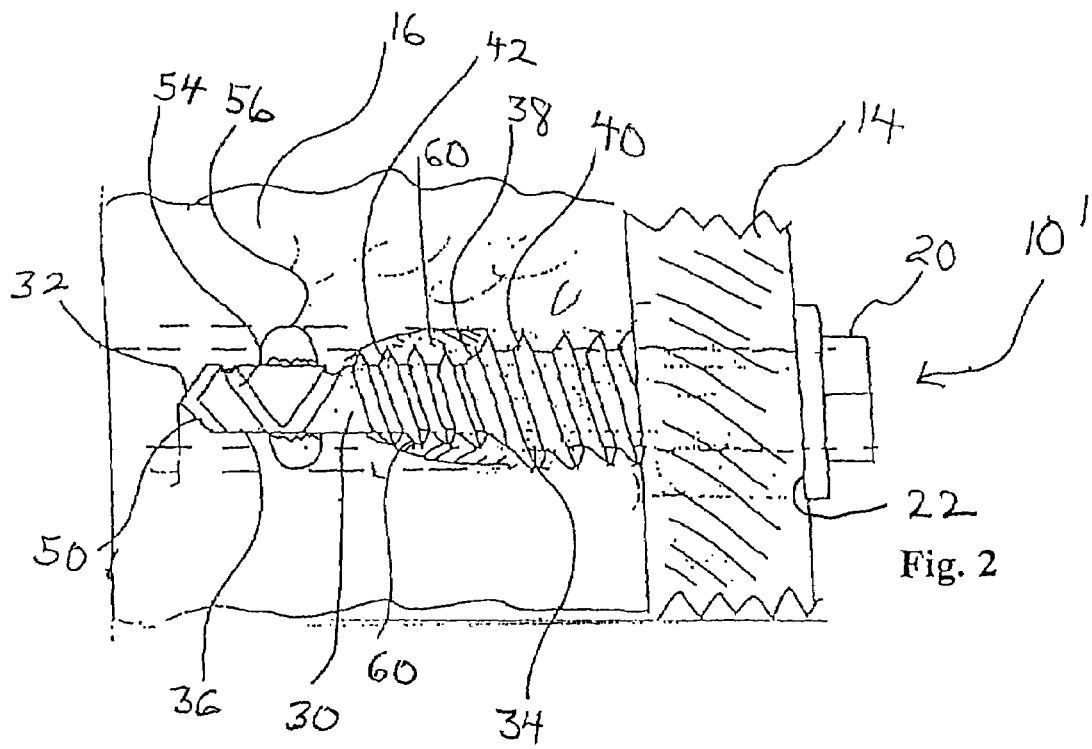
FIG. 2 is a side view, partly in section, of a different embodiment of the inventive fastener mounting a board to a masonry structure.

With reference to the drawings, several embodiments of a fastener in accordance with the present invention are described and respectively designated by the numerals 10, 10', 10", 100 and 100'. Each fastener is particularly adapted for attaching an object, such as an electrical panel box 12 (FIG. 1) or a board 14 (FIG. 2) or a plastic panel to a masonry supporting structure 16.

Each fastener has a head 20 which includes a generally planar engagement surface 22 for clamping engagement with the object. The head may have a circumferential shape, such as a hexagon, which is sized to fit within a socket so that torque may be applied to the head and thereby the fastener to drive the fastener into the masonry support structure. Alternatively, the head may include a blade slot 24 or a recessed axial socket (not illustrated) for receiving a torque driver. Preferably as shown in FIGS. 3–6, the head comprises both a circumferential shape and a slot for rotationally driving the fastener.

Each fastener 10, 10' has a shank 30 which axially extends from the planar engagement surface to an opposing distal tip 32. The shank 30 includes a cylindrical proximal portion 34, defining a first diameter adjacent the shank head. The shank also comprises a cylindrical distal portion 36 having a second diameter less than the proximal diameter adjacent the shank distal tip. The shank proximal and distal portions are connected by a frusto-conical surface 38.

Figure 1:
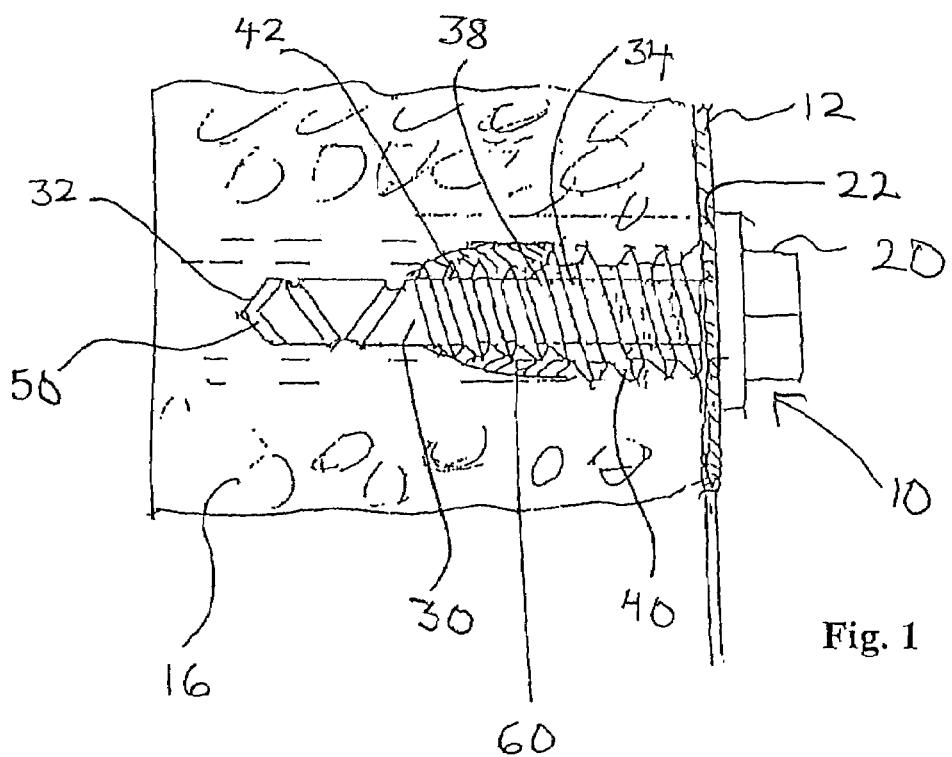
FIG. 1 is a side view, partly in section, of an inventive fastener mounting on an electrical panel box to a masonry support structure.

In the embodiments shown in FIGS. 1 and 2, a first thread 40 extends helically along the length of the shank proximal portion. The first thread has a crest defining an outside or crest diameter, and preferably extends from the planar engagement surface to the frusto-conical surface 38. A second thread 42 extends helically along the shank distal portion from the frusto-conical surface towards the tip. The second thread has a crest defining an outside or crest diameter which is preferably substantially equal to the shank proximal portion diameter. The first and second threads 40, 42 may comprise buttress threads with a driving face perpendicularly oriented with respect to the shank axis and a leading face obliquely angled with respect to the shank axis.

As shown in FIGS. 3–6, fastener 10" is configured so that either or both of the shank proximal and distal portions are traversed by a protuberance. A first protuberance 44 extends helically along the shank proximal portion spaced between adjacent convolutions of the first thread 40. The first protuberance defines a crest diameter which is less than the crest diameter of the first thread. The first protuberance preferably extends from the planar engagement surface 22 to the frusto-conical surface 38 and has substantially the same pitch as the first thread.

A second protuberance 46 extends helically along the shank distal portion spaced between adjacent convolutions of the second thread 42. The second protuberance defines a crest diameter which is less than the crest diameter of the second thread. The second protuberance preferably extends from the frusto-conical surface 38 towards the tip 32 and has substantially the same pitch as the first thread. Preferably, the first protuberance crest diameter is substantially the same as the second thread crest diameter and the second protuberance crest diameter is preferably substantially the same as the drill tip 32 diameter.

Figure 7:
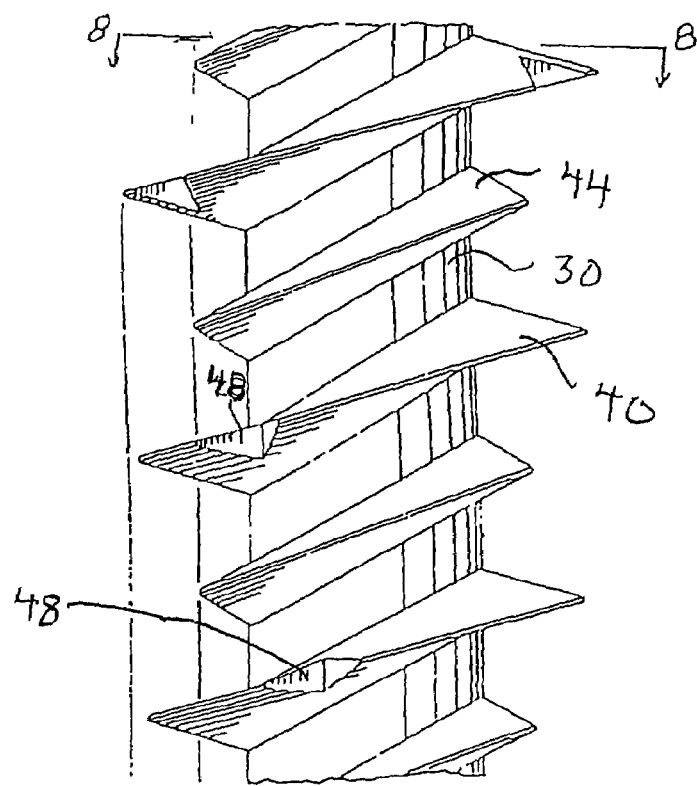
FIG. 7 is a side elevational view of a portion of a fastener incorporating notches formed in the thread crests.
Figure 8:
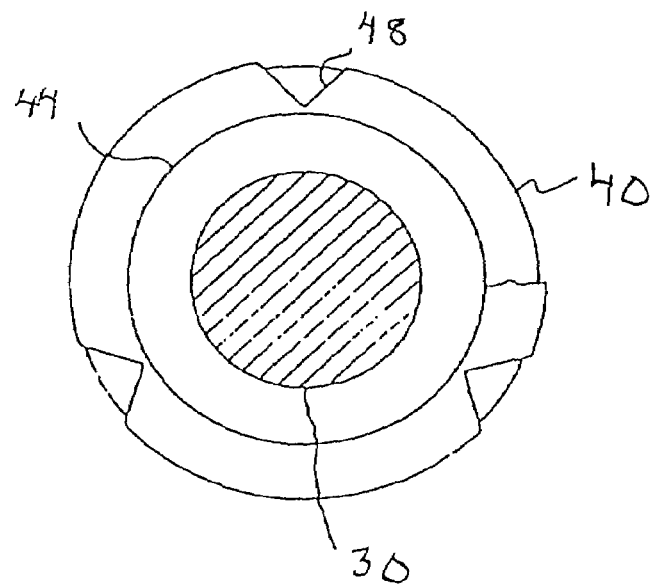
FIG. 8 is a cross-sectional view taken along lines 8—8 of FIG. 7.

A series of notches 48 may be formed in the crest of the first and/or second threads as shown in FIGS. 7 and 8. The notches 48 may be of decreasing radial penetration into the thread crests. In embodiments with a protuberance spaced between thread convolutions the innermost point of the notch is preferably radially outwardly of the protuberance crest diameter.

The shank distal tip functions as a drill point 50. The drill point 50 is preferably comprised of carbide or other suitable hard material which will bore through masonry and masonry-like support structure. Naturally, the drill tip would also function to bore through softer materials such as, for instance, wood. Preferably, the drill tip includes a pair of carbide cutting edges 52 (FIG. 4) each obliquely angled with respect to the shank axis. The carbide drill edges may be formed from a single shaped piece of carbide which is mounted to the shank tip. Alternatively, separate pieces of carbide, each comprising a cutting edge may be mounted to the shank tip. The carbide cutting edges may be linear or shaped. The linear carbide drill edges are more economical to manufacture, however, shaped carbide drill edges, while more expensive, may increase the drilling efficiency of the fastener. In either configuration, the diameter of the carbide drill point will be substantially the same as that of the shank distal portion.

A material transfer channel 54 spans the axial distance between the carbide drill point and the second thread. The material transfer channel is formed within the shank distal portion so that the trough of the channel is displaced radially inwardly from the shank distal portion circumference. Although the material transfer channel 54 is shown as comprising intersecting, obliquely angled troughs in FIGS. 1 and 2 and a helically extending trough in FIGS. 3–6, material transfer channels of other configurations such as, for instance, linearly extending parallel with the shank axis are fully encompassed by the invention.

The shank of the fastener has a coating 60 which may be composed of an adhesive, a polymer, or both an adhesive and a polymer. The adhesive may be coated over the first and second thread areas 35, 37, including the shank proximal and distal portions encompassed by those areas. Preferably, the adhesive is coated over the second thread area 37 and shank distal portion encompassed by the second thread area. The adhesive is preferably in microencapsulated form so that after application of the adhesive, but before use, the fastener may be handled and stored without substantial hardening or unwanted transfer of the adhesive material.

The polymer may be coated over the first and second thread areas 35, 37, including the shank proximal and distal portions encompassed by those areas. Preferably, the polymer is coated over the first thread area and shank distal portion encompassed by the first thread area. Most preferably, the polymer is applied over at least ninety degrees of the total circumference of the first thread area, including the shank proximal portion. The polymer is preferably nylon or an epoxy system which is cured, completely dry and fused to the fastener.

It should be noted that the polymer may be coated on the fastener in combination with the adhesive. In this embodiment, the fastener is preferably coated with an adhesive in the second thread area and a polymer in the first thread area.

In the fastener 10' shown in FIG. 2, a tab or wing 56 radially extends from the shank distal portion. Preferably the tab is located between the carbide drill point 50 and the second thread 42. When the fastener is rotated, the radially outermost portion of the tab defines a circumference which is preferably substantially equal with, or slightly greater than, the first thread crest diameter. The root of the tab, where the tab is attached to the shank distal portion, comprises a weakened section to allow the tab to eventually break off. The weakened section may be an area where the thickness of the tab material is lessened. A tab may also be used in combination with the fasteners 10– shown in FIGS. 3–6.

The fasteners 10, 10' are installed by aligning the fastener head 20 with a driving device so that rotational force may be applied to the fastener. The fastener drill point 50 is placed in a desired location and rotation is applied to the fastener. As rotational torque is applied to the fastener, the carbide drill point drills a pilot hole through the substrate. The substrate may be a masonry 16 or masonry-like support structure or alternatively a metal panel box 12 as shown in FIG. 1 or a board 14 as shown in FIG. 2. The carbide drill point continues to drill a hole into the masonry support structure. The dust and grit created by the carbide drill edges contacting the masonry support structure is moved through the material transfer channel into the space between adjacent convolutions in a first thread area.

In the fastener 10' shown in FIG. 2, the tabs 56 serve to bore a clearance hole in the board so that the first threads do not contact the board as the fastener penetrates the masonry support structure. When the tabs encounter the masonry support structure, they shear off. Tab shearing can be controlled and accentuated by design of the weakened area at the tab root. When the second thread 42 engages the masonry support structure, the driving face forces the fastener inwardly. As used herein, inwardly refers to a direction from the fastener head toward the fastener distal tip. As the fastener continues inwardly, dust and grit created by the carbide drill point is moved through the material transfer channel 54 into the space formed between adjacent second thread convolutions. The notches 48, if present, will both help the second thread crest, penetrate the masonry support structure and help move the grit. A portion of the dust and grit mixes with the adhesive coating to create an activated grit/adhesive mixture. The second protuberance, if present, will serve to open the bore created by the drill tip and move grit outwardly along the shank distal end.

As the fastener travels further inwardly, the driving face of the first thread 40 engages the masonry support structure. It should be noted that the second thread 42 engagement with the masonry support structure serves to expand the pre-drilled bore from the distal portion diameter to the proximal portion diameter, considerably easing the entrance of the first thread portion into the masonry support structure. The first protuberance 44, if present, will serve to open the bore created by the distal portion to the diameter of the second thread crest, considerably easing the entrance of the first thread portion into the masonry support structure. The first protuberance also moves the activated grit/adhesive mix outwardly along the shank proximal end. Further, inward movement of the fastener forces the activated grit/adhesive mixture into the reservoir created by the first thread convolutions and first protuberance convolutions if present. The notches 48, if present, will both help the first thread crest penetrate the masonry support structure and help move the activated grit/adhesive mixture.

Continued inward movement of the fastener moves the head 20 inwardly and cooperation of the head engagement surface 22 and panel box 12 or board 14 draws the panel box or board into firm contact with the masonry support structure 16. When the head engagement surface, supported object and masonry sub-straight are drawn into firm surface-to-surface contact, further rotation of the fastener is prevented. The activated grit/adhesive mixture, now distributed throughout the first and second thread areas, bonds the fastener to the masonry support structure, thereby preventing the fastener from backing out and loosening.

The polymer coating 60, if present, is compressed as the fastener is driven into the masonry support structure. The compressed polymer functions to exert a spring-like wedging pressure between the fastener and the masonry support structure. The wedging pressure forces the first threads into strong contact with the masonry support structure, increasing the resistance of the fastener to backing out and loosening. Since the polymer does not require activation or mixing with grit, coating of the fastener distal portion is not necessary.

Figure 9:
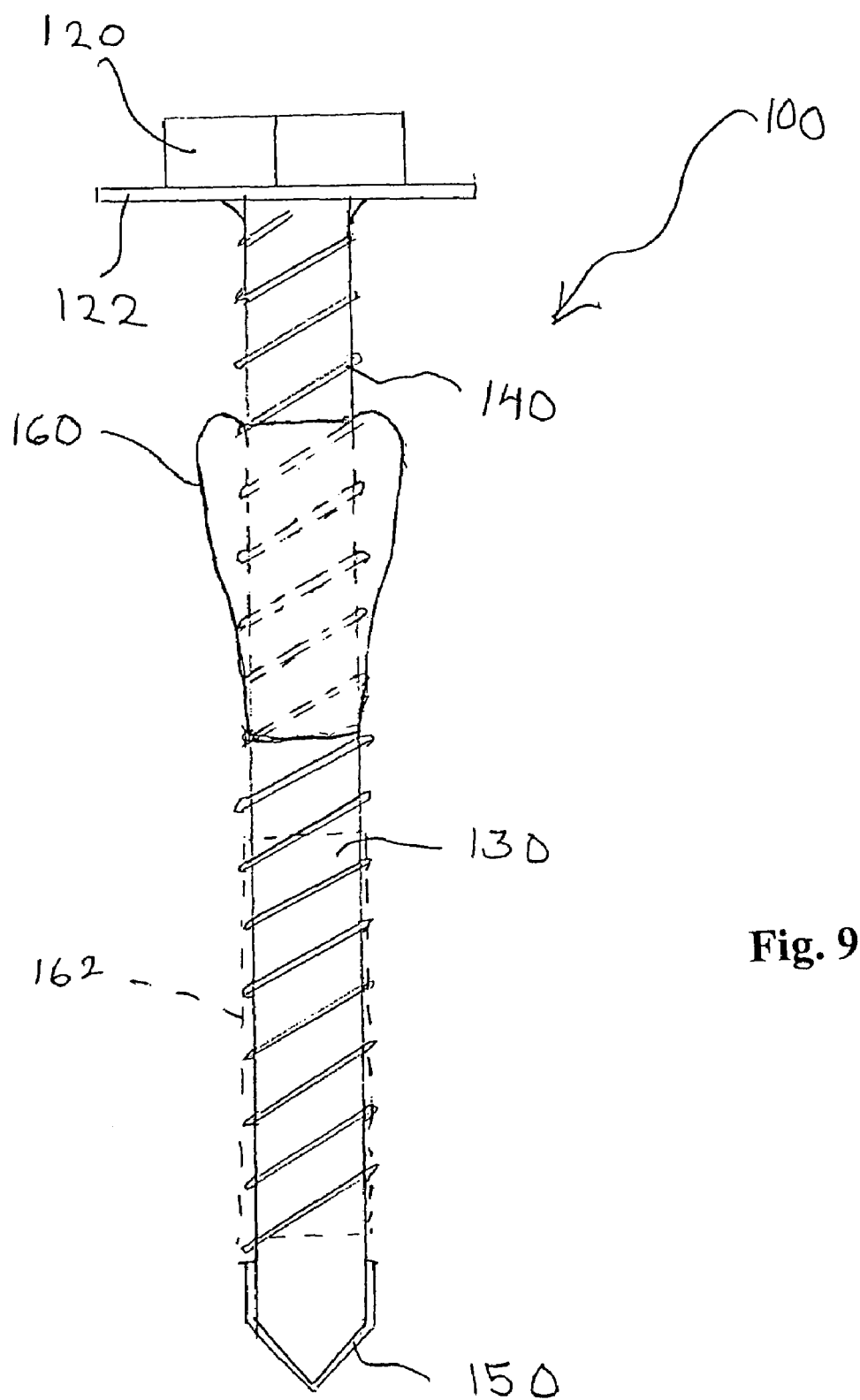
FIG. 9 is an enlarged side elevational view, partly in phantom, of another embodiment of an inventive fastener in accordance with the present invention wherein a second set of threads is not required.

With reference to FIG. 9, another embodiment of a self-drilling fastener which is specially adapted for concrete block is designated generally by the numeral 100. The fastener 100 includes a hexhead 120 which at its underside includes a flange-like planar engagement surface 122. The head is configured to receive torque applied to the head to drive the fastener shank 130 into the masonry support structure with the engagement surface clamping against an electrical box panel, a furring strip or other substrate.

The fastener 100 includes a helical thread 140 having a generally uniform axial spacing traversing a substantial portion of the shank 130 and a carbide tip 150 at the distal end for self-drilling into the concrete. The fastener can be dimensioned for a given application. For example, the fastener would typically be 1⅞" long or 1¼" long for an electrical box anchor or 2½" long for a furring strip anchor.

A resin patch or bead 160 is applied to the shank 130 to form a pear-shaped or cardioid surface of revolution around the central axis of the shank. In one preferred configuration, the bead 160 was applied and positioned at its upward extent approximately 2–3 thread spaces below the engagement surface and extended for 4–5 threads. The epoxy adhesive in one preferred form included five milliliters of hardener, five milliliters of resin and five milliliters of nylon powder. The resin used for these initial tests was an epoxy adhesive of Devcon. The epoxy formulation to which the nylon powder was added was a Devcon high-strength, two-ton, crystal clear epoxy with thirty minute working time. The epoxy system with the microencapsulated hardener may employ a proprietary ND Industries formulation.

A circumferential coating 162 composed of an epoxy adhesive with microcaps was also applied to the lower intermediate shank and threads between the resin patch 160 and the carbide tip 150 in some embodiments. The adhesive resin contains microcaps of hardener which are broken during installation of the fastener. The hardener mixes with the resin and the system begins to cure. The lower portion of the shank may also be affixed with wings (not illustrated) substantially identical to wings 56.

Figure 10:
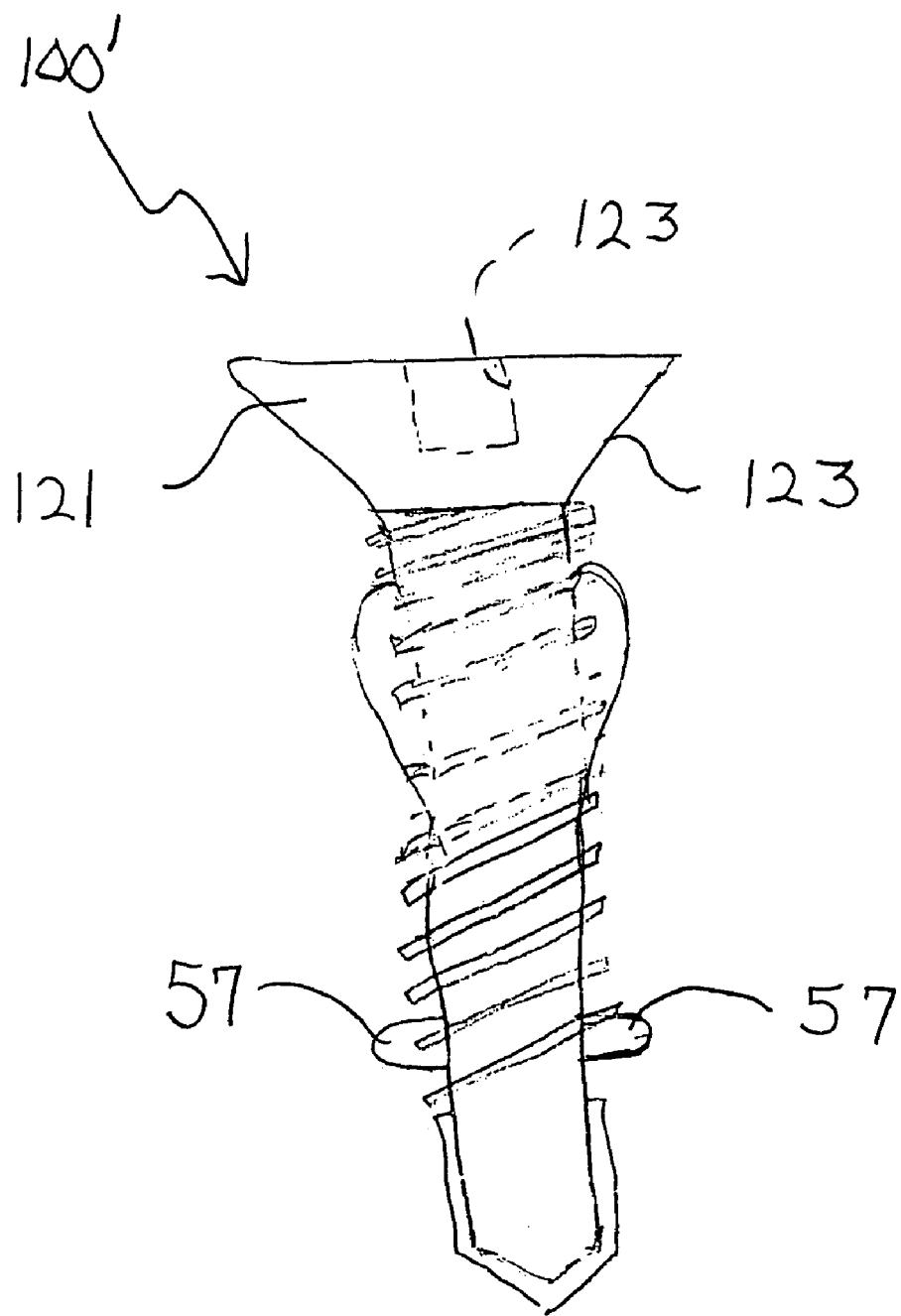
FIG. 10 is an enlarged side elevational view, partly in phantom, of another embodiment of an inventive fastener for anchoring furring strips to a concrete block in accordance with the present invention.

Another embodiment of the self-drilling fastener which is especially adapted for anchoring concrete furring strips to concrete block is designated by the numeral 100' and illustrated in FIG. 10. Fastener 100' may be substantially identical to the fastener a 100 except in terms of a flat head 121 rather than the hex head 120, and the tapered surface 123 which permits countersinking into the furring strip. An axial socket 127 is employed to receive the drive torque. In addition, wings or tabs 57 which break-off when they encounter the concrete may be employed.

TEST EXAMPLES

A number of examples of 1⅞" fasteners similar to fastener 100 with a diameter of ¼" and a pilot drill point of 9/16" were tested with various formulations of the resin bead as well as the shape of the resin bead and the presence or absence of the coating of adhesive at the lower intermediate portion of the shank. The fasteners were drilled into a representative standard concrete block until the fastener had cut to the desired depth. Various measurements and observations resulted in a number of preliminary conclusions. It was found that approximately a 30% by volume nylon filler in the resin system was suitable while a 50% by volume or more nylon filler made the resin softer which apparently facilitated peeling and crumbling of the resin mass during the drilling. A number of bead configurations for the resin were applied to the fasteners. The pear or cardioid shape of the resin appeared to be optimal because it allowed a substantial portion of the dust or the powder created during the drilling into the concrete to escape while also substantially resisting the peeling or crumbling of the resin in the approximately 30% nylon-filled formulations. The resin also warmed during installation so that some powder was entrained in the resin. The tests were made using a DeWalt Model VSR 286 screw gun wherein the gun RPM output was varied during the drilling process. The fastener examples were typically suitably anchored into the 1¼" concrete block in approximately ten seconds. It appears that the pear-shaped or cardioid bead worked best when it was applied approximately uniformly at 360° around the fastener.

EXAMPLE I

In one example, a 1⅞" fastener with a hexhead was drilled into a 1¼" wall of a standard concrete block. The patch had a 30% by volume nylon filler, and no adhesive or epoxy with microheads or other substance was applied to the lower portion of the shank. The break-loose torque was measured at approximately 45 ins-lbs. The 360° torque was measured at approximately 30 ins-lbs. The residual torque was measured at approximately 25 ins-lbs.

EXAMPLE II

In a second example, the fastener was configured substantially identical to the Example I fastener except a coating consisting of epoxy with microcaps was applied to the lower end of the shank. The fastener was drilled into the concrete block substantially similar to the fastener installation of Example I. The break-loose torque was measured to be approximately 125 ins-lbs., the 360° torque was approximately 85 ins-lbs., and the residual torque was approximately 70 ins-lbs.

EXAMPLE III

In a third example, a fastener was configured substantially identical to that of Example II except the coating employed 50% nylon filler in addition to the epoxy with the microcaps. The fastener was drilled into the 1¼" wall of the concrete block substantially similar to the fasteners of Examples I and II. The break-loose torque was measured to be approximately 50 ins-lbs., a 360° torque was measured to be approximately 35 ins-lbs., and a residual torque was measured to be approximately 35 ins-lbs.

It was observed for Examples I, II and III that the concrete powder which formed when installing the fastener in the concrete block was not trapped by the resin patch but apparently was guided around the patch and migrated to the surface of the concrete block.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A connection comprising:
 a masonry support structure and a fastener received in said masonry support structure, said fastener comprising;
 head means comprising a engagement surface and drive means for receiving an applied torque;
 a shank axially extending from said head means at a proximal end to a distal end terminating at a tip, said shank comprising a proximal portion defining a first diameter adjacent said shank proximal end and a distal portion having a second diameter less than said first diameter adjacent said shank distal end, a first thread extending helically along a portion of said proximal portion and a second thread extending helically along a portion of said distal portion, said second thread not extending to said distal end, said shank distal end defining material transfer means within said second diameter extending from a location adjacent said tip to a location adjacent said second thread such that said material transfer means spans the axial distance between said tip and said second thread;
 a coating comprising a resin or an adhesive in a microencapsulated form disposed over at least one of the group consisting of said shank distal portion, said shank proximal portion, said first thread and said second thread; and
 self-drilling means adjacent said shank tip for drilling into said support structure, said self drilling means creating masonry dust from said masonry support structure, some of said masonry dust being mixed with said coating.

2. The connection of claim 1, wherein said coating is an adhesive in a microencapsulated form.

3. The connection of claim 1 further comprising a radially extending wing extending from said shank distal portion.

4. The connection of claim 1, wherein said self-drilling means comprises a carbide drill point.

5. The connection of claim 1, wherein said first and second threads are buttress threads.

6. The connection of claim 1, wherein said first thread defines a first thread crest diameter which is substantially equal over the length of said first thread and said second thread crest diameter is substantially equal over the length of said second thread.

7. The connection of claim 1, wherein the coating is a cured polymer.

8. The connection of claim 1 comprising a protuberance extending helically between adjacent convolutions of at least one of said first or second threads.

9. The connection of claim 8, wherein the protuberance has a crest diameter less than that of adjacent convolutions.

10. A connection comprising:
 a masonry support structure and a fastener received in said masonry support structure, said fastener comprising;
 head means comprising a engagement surface and drive means for receiving an applied torque;
 a shank axially extending from said head means at a proximal end to a distal end terminating at a tip comprising self-drilling means for drilling into said support structure, said shank comprising a proximal portion adjacent said shank proximal end, a first intermediate portion adjacent said proximal portion, a second intermediate portion between said first intermediate portion and said tip and a thread extending helically along said intermediate portions; and
 a resin bead applied only to said first intermediate portion.

11. The connection of claim 10, wherein said bead is composed of a hardener, a resin and nylon powder.

12. The connection of claim 10, wherein said bead has a generally cardioid-shaped configuration which subtends substantially 360° around the axis of the shank.

13. The connection of claim 11, wherein said bead is composed of approximately 30% nylon powder by volume.

14. The connection of claim 11, wherein said bead is composed of a formulation that was made with approximately five milliliters of hardener, five milliliters of resin and five milliliters of nylon powder.

15. The connection of claim 10 further comprising an adhesive in a microencapsulated form applied to said second intermediate portion.

16. The connection of claim 10 further comprising a radially extending wing extending from said shank distal portion.

17. The connection of claim 10, wherein said self-drilling means comprises a carbide drill point.

18. The connection of claim 10, wherein said thread is a buttress thread.

19. The connection of claim 10, wherein said thread has a generally uniform axial spacing S and said proximal portion extends axially a distance ranging between 2–3 S and said first intermediate portion extends axially a distance approximately 4–5 S.

20. A connection comprising:
 a masonry support structure and a fastener received in said masonry support structure, said fastener comprising;
 a head comprising an engagement surface and drive means for receiving an applied torque;
 a shank axially extending from said head at a proximal end to a distal end terminating at a tip, said shank comprising a proximal portion adjacent said shank proximal end, an intermediate portion between said proximal portion and said tip and a thread extending helically along said intermediate portion, said shank tip comprising self-drilling means for drilling into the support structure; and
 a bead comprising an epoxy resin applied only to said first intermediate portion,
 so that upon driving said fastener into said structure said thread mechanically engages said structure and said shank bonds with said structure.

* * * * *